June 1, 1965  T. W. WOODRUFFE-PEACOCK  3,186,095
MEANS FOR FACILITATING THE ASSEMBLY OF BARREL STAVES AND HEADS
Filed July 28, 1961  2 Sheets-Sheet 2
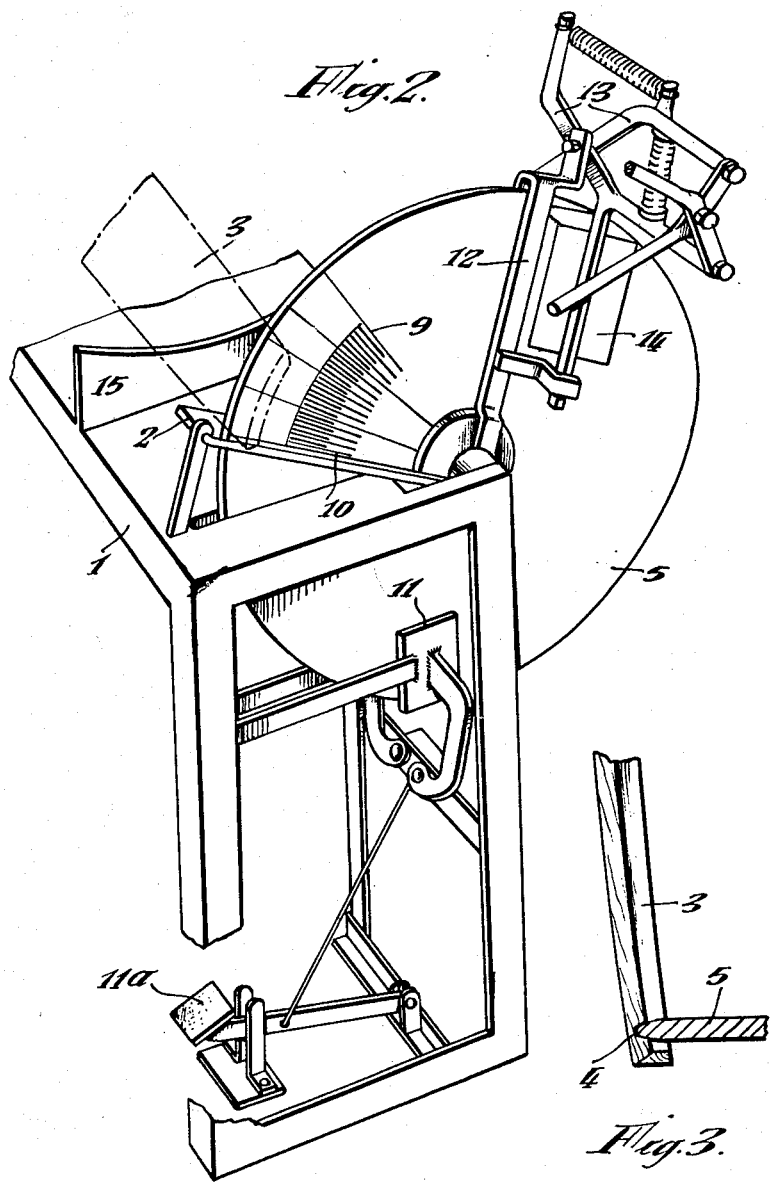

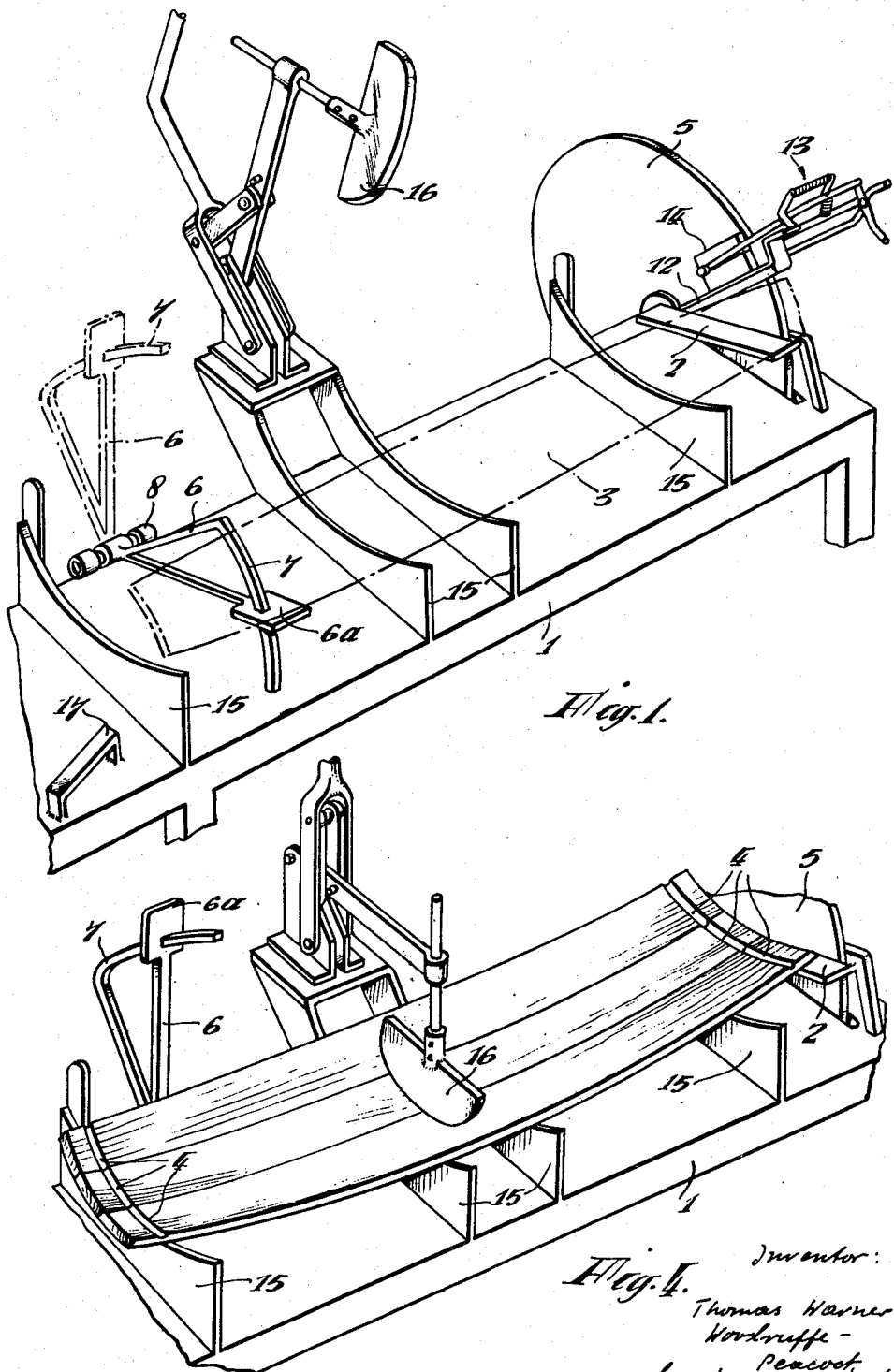

United States Patent Office 3,186,095
Patented June 1, 1965

3,186,095
MEANS FOR FACILITATING THE ASSEMBLY OF BARREL STAVES AND HEADS
Thomas W. Woodruffe-Peacock, Wilmslow, England, assignor to William Grant and Sons Limited, a British company of The Glenfiddich Distillery, Dufftown, Banffshire, England
Filed July 28, 1961, Ser. No. 127,728
Claims priority, application Great Britain, July 29, 1960, 26,509
5 Claims. (Cl. 33—174)

The present invention relates to means for facilitating and speeding up of the assembly of barrel staves and heads to form barrels.

A drawback experienced with the conventional method of assembling the staves and heads of barrels is that the combined lengths of the croze of the staves in which the edges of the heads are received is not always equal to the circumference of a head resulting in a bad fit and necessitating dismantling of the barrel and replacement of one or more of the staves by ones having croze of a correct size.

The primary object of the invention is the provision of means whereby it can be ascertained, prior to assembly, that the combined length of the croze of a set of staves for forming a barrel is equal to, or substantially equal to (e.g. to within about 1/16″) the circumference of a barrel head.

A further object of the invention is the provision of means which will enable a plurality of staves, e.g. three to be placed together side by side and then bowed to adopt the curvature they will assume in a finished barrel so that it can be checked that the croze of the staves align with one another.

This checking is desirable when it is required to replace a cracked or otherwise defective stave by a sound one and the sound stave can be positioned between two original staves and its croze checked with those of the original staves on either side of the one to be replaced.

A still further object of the invention is the provision of means which will enable each stave to be tested for cracks.

According to the present invention there is provided a method of matching a set of staves to ensure that the combined lengths of the croze thereof is equal to, or substantially equal to the circumference of a barrel head to be received therein, which consists in supporting a first stave of a set so that the croze straddles or fits over the edge of a wheel or disc marked with dimensional graduations, engaging a gauge swingable about the axis of said wheel with the edge of the stave opposite the edge on which it is supported and locking the gauge to the wheel, removing said stave and then turning the wheel to bring the gauge opposite a datum line, locking said wheel and releasing said gauge and then repeating the operation for each of the remaining staves except for the last one.

The apparatus provided by this invention for carrying out the foregoing method comprises a rotatable measuring wheel provided with dimensional graduations around its periphery, a stave support located in a plane radial to the axis of said wheel, a gauge swingable about the axis of said wheel, means for locking the gauge to the wheel when measuring a croze, and means for locking the wheel in a set position after it has been turned to record a reading and pending the positioning on the support of another stave to be measured.

It will be appreciated that the length of a croze of a stave is measured and that by then releasing and turning the wheel until the locked gauge reaches the datum line, this measurement is automatically added to the sum of the measurements of croze of previously measured staves. The wheel is stopped when the gauge carried thereby abuts against the surface of the stave support which can constitute the datum line. For example, and simply for the purpose of explanation it will be assumed that staves having croze of identical dimensions are being measured. A reading of say 3″ may be obtained for the first measured stave by swinging and locking the gauge against the top edge of the supported stave and the 3″ reading on the wheel will be moved (when the wheel is released and turned with the gauge locked thereto) opposite the datum line. The wheel is then locked in position the gauge released and turned back and a further stave supported so that its croze straddles the periphery of the wheel and the gauge is brought down on the upper edge thereof and locked in position and the stave is removed and the wheel again turned and a reading of 6″ will be brought opposite the datum line. This operation is repeated for all the remaining staves except for the last one so that if a barrel comprises 24 staves the reading for 23 staves will be 69″ thereby indicating that the croze of the last stave must measure 3″ to bring the sum total up to 72″ to suit a barrel head which is 72″ in circumference. It will be appreciated that the reference to identical dimensions in the example just quoted is given simply for convenience of explanation and that in actual practice the length of the croze of each stave may vary say from 1/16″ to 3/16″. Thus, assuming irregularity in the dimensions of the croze, the final reading for 23 staves may be 69 3/8 indicating that the final stave must have a croze measurement of 2 5/8.

When a first stave is measured the wheel is of course set at a starting position in which a zero marking thereon registers with the datum line, this is the surface of the stave support.

The method for satisfying the second object of the invention broadly comprises a support having a surface which is complementary to the longitudinal and transverse curvature of a barrel, and pressure-applying member for urging the staves against said support to make them adopt the curvature they assume in a completed barrel. Thus, when replacing a cracked or otherwise defective stave, a sound stave can be positioned between existing staves which previously received the cracked or otherwise defective one between them whereupon it can be ascertained that the croze of the sound replacement stave matches up with the croze of the existing staves on either side thereof.

The means for testing a stave to see whether it is cracked broadly comprises an inverted U-shape rod beneath the cross bar of which one end of a stave can be engaged and the stave then flexed to reveal any cracks therein.

To enable the invention to be clearly understood a preferred embodiment thereof will now be described by way of example with reference to the accompanying drawings wherein:

FIGURE 1 is a perspective view of the complete apparatus showing how the croze of staves are measured.

FIGURE 2 is a perspective view looking from the opposite end of the apparatus.

FIGURE 3 is a fragmentary view showing the croze of a stave engaged with the edge of the measuring wheel, and FIGURE 4 is a perspective view showing how the apparatus is used to check on the alignment of croze of adjacent staves.

Referring to the drawings and dealing firstly with the croze measuring appliance, this comprises a framework or bench 1 provided with a support 2 upon which one end of a stave 3 can be placed on edge as shown in FIGURES 1 and 2 and the croze 4 at that end made to embrace or fit about the peripheral edge of a measuring wheel 5. The supporting edge of this support 2 is disposed in a plane which is slightly inclined downwardly towards the wheel 5 so that a stave 3 can be slid to bring the base of the croze 4 into contact with the edge of the wheel 5.

The support 2 is located in a plane which is radial to the axis of said wheel 5 so that in effect the axis of the wheel is the axis of the radius of curvature of the croze 4 so that a very accurate reading can be obtained. The cross section of the wheel 5 at its edge is made as near as possible complementary to the cross section of the channel defined by the croze 4.

The measuring wheel 5 is located at or adjacent to one end of the bench 1 and, to enable a stave 3 to be advanced squarely against the wheel, a quadrant 6 having a stave support or platform 6a is provided for supporting the other end of the stave and this quadrant 6 has a curved edge 7 against which this other end of the stave 3 may be pressed and the centre of curvature of this quadrant 6 is disposed on the same axis as that of the measuring wheel 5. The quadrant 6 is pivoted at 8 so that it can be swung from an operative position indicated in full lines in FIGURE 1 to an inoperative position indicated in chain dotted lines in this figure for the reason hereinafter explained.

The periphery of the wheel 5 on one or both sides is marked with a scale of dimensional readings 9 which commence at a zero line 10 and extend around say a quarter the periphery of the wheel to a reading which exceeds the maximum reading likely to be required for a range of different size barrels.

The readings 9 may be graduated in sixteenths of an inch or any other suitable fractions of an inch.

In use the wheel 5 is first set at zero, e.g. at a position in which the zero line 10 on the wheel registers with the upper face of the stave supporting surface 2 which can be regarded as a datum line. At this stage the wheel 5 is locked against rotation by means of a brake 11 which can be of the caliper type and operated by a foot pedal 11a. The first stave is then placed on edge with one end resting on the support 2 and the croze at this end engaged with the periphery of the wheel 5. The other end of the stave rests on edge on the platform 6a of the quadrant 6. A gauge 12 comprising a U-shape bar which is swingable about the axis of the wheel 5 and which extends radially of the wheel 5 along both side faces thereof, is then swung against the top edge of the stave 3 and this gauge 12 is then locked in position on the wheel by any suitable hand-actuated mechanism which can conveniently comprise a hand actuated caliper-type cycle brake mechanism indicated generally at 13 which is carried by the gauge 12 and which is fitted with pressure or friction pads 14 at each side of the wheel and the adjacent part of the wheel is formed circumferentially with a plurality of small holes (not shown) to provide a gripping action between the pads 14 and the wheel 5.

After the gauge 12 has been swung down against a stave 3 the gauge 12 is locked to the wheel by the brake 13, 14 the stave removed, the foot brake 11, 11a released and the wheel 5 turned to move the stave-contacing edge 12a of the gauge against the support surface 2 for the stave. The foot brake 11, 11a for the wheel 5 is then actuated to hold the wheel in its adjusted position and the hand brake 13 for the gauge 12 is released to enable the gauge to be swung upwardly, temporarily locked, and subsequently swung downwardly on to the top edge of the next stave 3 to be measured. This operation is repeated for each stave so that intermittent partial turning movement of the wheel 5 automatically tots up the measurements of the various croze 4 of the staves 3. When all the staves 3 less one have been measured the reading on the wheel against the datum line, i.e., the top face of the stave support 2, is noted and then subtracted from the circumferential measurement of the head to be fitted in the croze 4 of the set of measured staves 3 thereby indicating to an operator that a final stave having a croze of a predetermined measurement is required to make up a set of staves which will accurately fit said head.

If desired, the checking of the staves 3 can be carried out with respect to the croze 4 at both ends of the staves.

The apparatus just described may also usefully be employed for measuring the croze 4 of any cracked or otherwise defective staves 3 to be replaced and which might be found when testing the staves for cracks and inspecting for other defects.

The said measuring wheel 5 may conveniently be made of duraluminium and formed with weight-lightening holes (not shown) inside the area containing the small holes providing the friction surface for the locking of the gauge 12 to the wheel.

The means for satisfying the second mentioned object of the invention comprises four spaced apart parallel plate-like supports 15 arranged in line formation and having their upper edges (which are located below the supports 2 and 6a) curved to the curvature of the outer face of a finished barrel. These plate-like supports 15 are also curved or chamfered in the direction of their thickness so that the upper edges of the plates 15 combine to define the longitudinal curvature of the barrel. Conveniently, four plate-like supports 15 are provided consisting of two end plates which support the staves 3 adjacent their ends and two intermediate plates which support the staves at each side of the centre of its length.

The stave 3 to replace a defective one is positioned (see FIGURE 3) on said supports 15 between existing neighbouring staves between which it has to be fitted and an appropriately shaped clamp 16 is then swung down against the centre of the lengths of the assembly of three staves 3 to flex the staves longitudinally into a bowed condition which they assume in the finished barrel. The staves are initially adjusted to bring their croze 4 into alignment so that when the staves have been flexed it can be seen whether or not the croze are lined up correctly so as to receive the head of the barrel therein. The clamp 16 need only be narrow so as to engage the staves 3 at the centre of their length and need not extend the full lengths of the staves. When this testing of the staves is being performed the quadrant 6 is swung up into an unobstructive position.

To facilitate testing of the staves the work bench is fitted with an inverted U-shape rod or bar 17 (FIGURE 1) so that one end of a stave 3 can be engaged beneath the crossbar of the U and the stave then flexed by hand to see whether any cracks exist therein.

To enable the testing operations to be carried out as efficiently as possible it is preferred to arrange the testing equipment described on a single bench 1 which is positioned adjacent to racks containing a stock of staves 3 which are marked with the croze to croze measurement following the inside curve of the stave so that the latter are immediately accessible to an operator.

I claim:

1. A method of matching a set of staves to ensure that the combined lengths of the croze thereof is equal to, or substantially equal to the circumference of a barrel head to be received therein, which consists in supporting one end of a first stave of a set with one end of a croze therein located at a datum line so that the croze extends from said datum line over the edge of a wheel marked with dimensional graduations, engaging a gauge swingable about the axis of said wheel with the edge of the stave opposite the edge on which it is supported and locking the gauge to the wheel, removing said stave and then turning the wheel to bring the gauge in line with said datum line, locking said wheel and releasing said gauge and then repeating the operation for each of the remaining staves except for the last one.

2. Apparatus for matching a set of staves to insure that the combined length of the croze thereof is substantially equal to the circumference of a barrel head to be received therein, comprising a base; a rotatable measuring wheel mounted on said base and provided with dimensional graduations around its periphery along at least part of said wheel and adapted to abut at any portion of its periphery the croze of a stave, a stave support located in a plane radial to the axis of said wheel, and adjacent to the periphery thereof, a gauge swingable about the axis of said wheel along the periphery thereof, means for locking the gauge to the wheel when measuring said croze, and means for locking the wheel to said base in a set position after it has been turned to indicate a reading and pending the positioning on the support of another stave to be measured.

3. Apparatus according to claim 2, including an end support for the other end of a stave remote from said measuring wheel, said support comprising a curved edge against which this other end of the stave can be engaged, the centre of curvature of this curved edge being axially aligned with the axis of the measuring wheel and being provided with a platform upon which can be rested an edge of a stave.

4. Apparatus according to claim 3, including a plurality of spaced supports and wherein said support is displaceable into an unobstructive position in which it permits a stave to be engaged in face contact with said spaced supports to enable the croze of adjacent staves to be tested for alignment.

5. Apparatus according to claim 4, including the provision of a clamp which can be engaged centrally of the lengths of said staves to urge them against said spaced supports so as to flex the staves longitudinally into a bowed condition which they assume in the finished barrel whereby after the staves have been flexed it can be ascertained whether the croze of the staves are in alignment.

References Cited by the Examiner

FOREIGN PATENTS 607,188   8/48   Great Britain.

ISAAC LISANN, *Primary Examiner.*

W. A. SCHEEL, *Examiner.*